(12) United States Patent
Soukharev et al.

(10) Patent No.: US 11,018,865 B2
(45) Date of Patent: May 25, 2021

(54) COUNTERMEASURES AND OPTIMIZATIONS IN ELLIPTIC CURVE CRYPTOGRAPHIC SCHEMES

(71) Applicant: INFOSEC GLOBAL INC., Toronto (CA)

(72) Inventors: Vladimir Soukharev, Toronto (CA); Basil Hess, Zurich (CH)

(73) Assignee: InfoSec Global Inc., Toronto (CA)

( * ) Notice: Subject to any disclaimer, the term of this patent is extended or adjusted under 35 U.S.C. 154(b) by 0 days.

(21) Appl. No.: 16/539,629

(22) Filed: Aug. 13, 2019

(65) Prior Publication Data

US 2020/0044845 A1 Feb. 6, 2020

Related U.S. Application Data

(63) Continuation of application No. PCT/CA2017/050170, filed on Feb. 13, 2017.

(51) Int. Cl.
*H04L 9/30* (2006.01)
*H04L 9/00* (2006.01)

(52) U.S. Cl.
CPC ............ *H04L 9/3066* (2013.01); *H04L 9/002* (2013.01)

(58) Field of Classification Search
CPC ................................ H04L 9/3066; H04L 9/002
See application file for complete search history.

(56) References Cited

U.S. PATENT DOCUMENTS

| | | | |
|---|---|---|---|
| 9,590,805 B1* | 3/2017 | Parkinson | H04L 9/3066 |
| 2008/0219438 A1* | 9/2008 | Ebeid | G06F 7/725 |
| | | | 380/30 |
| 2008/0273694 A1* | 11/2008 | Ebeid | H04L 9/003 |
| | | | 380/28 |
| 2009/0052657 A1* | 2/2009 | Golic | G06F 7/725 |
| | | | 380/28 |
| 2010/0040225 A1* | 2/2010 | Venelli | H04L 9/004 |
| | | | 380/28 |
| 2011/0320511 A1* | 12/2011 | Shimuzu | G06F 7/5332 |
| | | | 708/204 |
| 2016/0087802 A1* | 3/2016 | Peeters | H04L 9/003 |
| | | | 713/176 |

* cited by examiner

*Primary Examiner* — Khoi V Le
(74) *Attorney, Agent, or Firm* — Bhole IP Law; Anil Bhole; Marc Lampert

(57) ABSTRACT

A method, system and elliptic curve cryptographic scheme for permitting secure communications between two or more cryptographic correspondent devices, the cryptographic scheme including a plurality of cryptographic operations applied to cryptographic parameters, the cryptographic operations including scalar multiplication of a point and a parameter, the elliptic curve cryptographic scheme characterized by selectively applying countermeasures and optimizations to the scalar multiplications by: applying a simple side-channel attack countermeasure for scalar multiplications that include a secret parameter as the parameter; applying a differential side-channel attack countermeasure for scalar multiplications when the elliptic curve point is not a generator point of the elliptic curve; and selectively applying optimizations.

20 Claims, 5 Drawing Sheets

COUNTERMEASURES AND OPTIMIZATIONS IN ELLIPTIC CURVE CRYPTOGRAPHIC SCHEMES

TECHNICAL FIELD

The following relates to data communication systems and cryptographic schemes utilized in such systems; and more specifically, to optimizations and side-channel attack countermeasures for elliptic curve cryptography.

BACKGROUND

Elliptic curve-based cryptographic ("ECC") schemes generally use cryptographic approaches that have been heavily scrutinized to avoid attacks on the scheme itself. However, there exist other types of attacks that target a physical implementation of a cryptosystem, emissions of the implementation, or the like. These types of attacks are generally referred to as side-channel attacks ("SCA"). In some cases, side-channels can include power consumption, timing, and emissions such as radio frequency ("RF") or sound.

In general, SCAs can be either simple side-channel attacks ("Simple SCA" or "SSCA") or differential side-channel attacks ("Differential SCA" or "DSCA").

Simple SCA can typically obtain information about the system from observed operations, usually single observed operations. In the case of ECC, such single operation can be a single scalar multiplication (i.e., the operation d·P). The security of ECC schemes is based on the hardness of the elliptic curve discrete logarithm problem ("ECDLP"); for a point P (of order n) on the elliptic curve and a random secret value $d \in \{1, \ldots, n-1\}$, it is hard to derive the discrete logarithm d from Q=d·P. Simple SCA typically exploit timing or power consumption characteristics of the scalar multiplication algorithm (for example, of the double-and-add scalar multiplication approach) that depend on the secret scalar d.

Generally, differential SCA are attempted if the attacker cannot derive sufficient information from a simple SCA. Differential SCAs typically can be attempted if side-channel information of operations, with the same secret scalar element and different group elements (for example, elliptic curve points) are available. Exploits typically employ statistical analysis to derive information about the secret scalar d. Differential SCA may also be known as Differential Power Analysis Attacks.

However, conventional countermeasures to SSCA and DSCA, at least, are typically not sufficiently targeted and require that the performance of a system employing the ECC be unduly diminished.

It is therefore an object of the present invention to provide an elliptic curve cryptographic scheme in which the above disadvantages are obviated or mitigated and attainment of the desirable attributes is facilitated.

SUMMARY

In an aspect, there is provided an elliptic curve cryptographic scheme for permitting secure communications between two or more cryptographic correspondent devices, each of the cryptographic correspondent devices comprising a processor and a memory, the memory configured to store a plurality of instructions which when executed by the processor cause the processor to implement the cryptographic scheme, the cryptographic scheme comprising a plurality of cryptographic operations applied to cryptographic parameters, the cryptographic operations comprising scalar multiplication of a point and a parameter, the elliptic curve cryptographic scheme characterized by selectively applying countermeasures and optimizations to the scalar multiplications by: applying a simple side-channel attack countermeasure for scalar multiplications comprising a secret scalar as the parameter; applying a differential side-channel attack countermeasure for scalar multiplications comprising a secret scalar as the parameter when the point is not a generator point of the elliptic curve; applying a fixed-base comb optimization for scalar multiplications when the generator point is fixed; applying a fixed-window optimization for scalar multiplications comprising a secret scalar as the parameter when the generator point is not fixed; and applying a sliding-window optimization for scalar multiplications comprising a public scalar as the parameter when the generator point is not fixed.

In a particular case, at least one of the optimizations comprise precomputation.

In another case, the fixed-base comb optimization is only applied when the fixed-base comb optimization does not conflict with the simple side-channel attack countermeasure.

In yet another case, the differential side-channel attack countermeasure comprises point masking.

In yet another case, the differential side-channel attack countermeasure comprises blinding.

In yet another case, the simple side-channel attack countermeasure comprises making observable information associated with the cryptographic correspondent device independent of the secret parameter.

In yet another case, the simple side-channel attack countermeasure comprises making the scalar multiplication have constant-time.

In yet another case, the simple side-channel attack countermeasure comprises making the scalar multiplication have constant power consumption.

In yet another case, the elliptic curve cryptography scheme is further characterized by applying further optimizations where applicable.

In yet another case, the further optimizations comprise coordinate selection.

In another aspect, there is provided a method for implementing an elliptic curve cryptography scheme on a cryptographic correspondent device, the cryptographic correspondent device securely communicating with at least one other cryptographic correspondent device, the cryptographic correspondent device comprising a processor and a memory, the memory configured to store a plurality of instructions which when executed by the processor cause the processor to implement the cryptographic scheme, the cryptographic scheme comprising a plurality of cryptographic operations applied to cryptographic parameters, the cryptographic operations comprising scalar multiplication of a point and a parameter, the method comprising selectively applying countermeasures and optimizations to the scalar multiplications of the elliptic curve cryptography scheme by: applying a simple side-channel attack countermeasure for scalar multiplications comprising a secret scalar as the parameter; applying a differential side-channel attack countermeasure for scalar multiplications comprising a secret scalar as the parameter when the point is not a generator point of the elliptic curve; applying a fixed-base comb optimization for scalar multiplications when the generator point is fixed; applying a fixed-window optimization for scalar multiplications comprising a secret scalar as the parameter when the generator point is not fixed; and applying a sliding-window optimization for scalar multiplications comprising a public scalar as the parameter when the generator point is not fixed.

In a particular case, the fixed-point optimization comprises precomputation.

In another case, the fixed-base comb optimization is only applied when the fixed-base comb optimization does not conflict with the simple side-channel attack countermeasure.

In yet another case, the differential side-channel attack countermeasure comprises point masking.

In yet another case, the differential side-channel attack countermeasure comprises blinding.

In yet another case, the simple side-channel attack countermeasure comprises making observable information associated with the cryptographic correspondent device independent of the secret parameter.

In yet another case, the simple side-channel attack countermeasure comprises making the scalar multiplication have constant-time.

In yet another case, the simple side-channel attack countermeasure comprises making the scalar multiplication have constant power consumption.

In yet another case, the method further comprises applying further optimizations where applicable.

In yet another case, the further optimizations comprise coordinate selection.

In yet another aspect, there is provided a system for implementing an elliptic curve cryptography scheme on a cryptographic correspondent device, the cryptographic correspondent device securely communicating with at least one other cryptographic correspondent device, the cryptographic correspondent device comprising a processor and a memory, the memory configured to store a plurality of instructions which when executed by the processor cause the processor to implement the cryptographic scheme, the cryptographic scheme comprising a plurality of cryptographic operations applied to cryptographic parameters, at least one of the cryptographic operations comprising scalar multiplication of a point and a parameter, the system comprising: a countermeasure module for applying: a simple side-channel attack countermeasure for scalar multiplications comprising a secret scalar as the parameter; and a differential side-channel attack countermeasure for scalar multiplications comprising a secret scalar as the parameter when the point is not a generator point of the elliptic curve; and an optimization module for applying: a fixed-base comb optimization for scalar multiplications when the generator point is fixed; a fixed-window optimization for scalar multiplications comprising a secret scalar as the parameter when the generator point is not fixed; and a sliding-window optimization for scalar multiplications comprising a public scalar as the parameter when the generator point is not fixed.

In a particular case, the fixed-point optimization comprises precomputation.

In another case, the fixed-base comb optimization is only applied when the fixed-base comb optimization does not conflict with the simple side-channel attack countermeasure.

In yet another case, the differential side-channel attack countermeasure comprises point masking.

In yet another case, the differential side-channel attack countermeasure comprises blinding.

In yet another case, the simple side-channel attack countermeasure comprises making observable information associated with the cryptographic correspondent device independent of the secret parameter.

In yet another case, the simple side-channel attack countermeasure comprises making the scalar multiplication have constant-time.

In yet another case, the simple side-channel attack countermeasure comprises making the scalar multiplication have constant power consumption.

These and other embodiments are contemplated and described herein. It will be appreciated that the foregoing summary sets out representative aspects of embodiments for an elliptic curve cryptography scheme to assist skilled readers in understanding the following detailed description.

DESCRIPTION OF THE DRAWINGS

An embodiment of the present invention will now be described by way of example only with reference to the accompanying drawings, in which.

DETAILED DESCRIPTION

Figure 1:
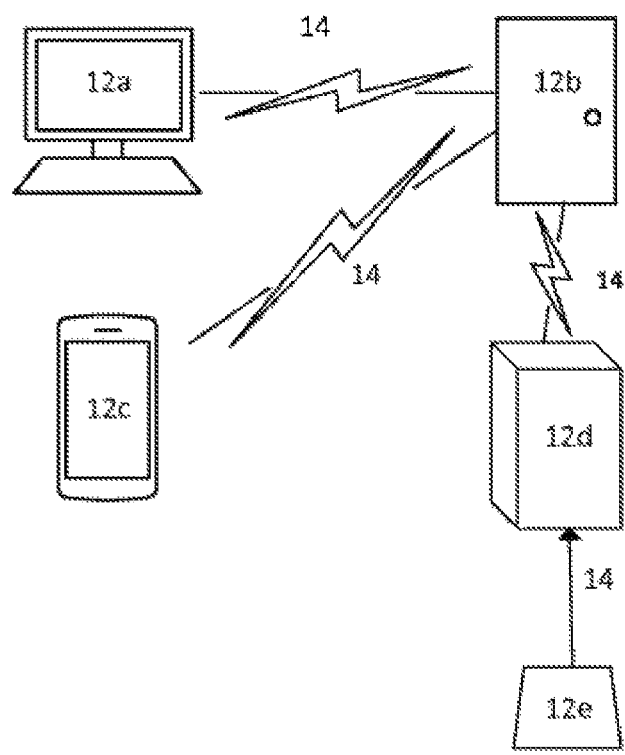
FIG. 1 is a schematic representation of a data communication system.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

A module, unit, component, server, computer, computing device, mechanism, terminal or other device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media and executed by the one or more processors.

The following relates to data communication systems and cryptographic schemes utilized in such systems; and more specifically, to optimizations and side-channel attack countermeasures for elliptic curve cryptography.

Turning to FIG. 1, an embodiment of a data communication system 10 is shown. The data communication system 10 includes a plurality of devices 12 interconnected by communication links 14. The devices 12 may be of any known type including a computer 12a, a server 12b, a cellphone 12c, ATM 12d, and smart card 12e. The communication links 14 may be conventional fixed telephone lines, wireless connections implemented between the devices 12, near field communication connections such as Bluetooth™ or other conventional forms of communication.

Figure 2:
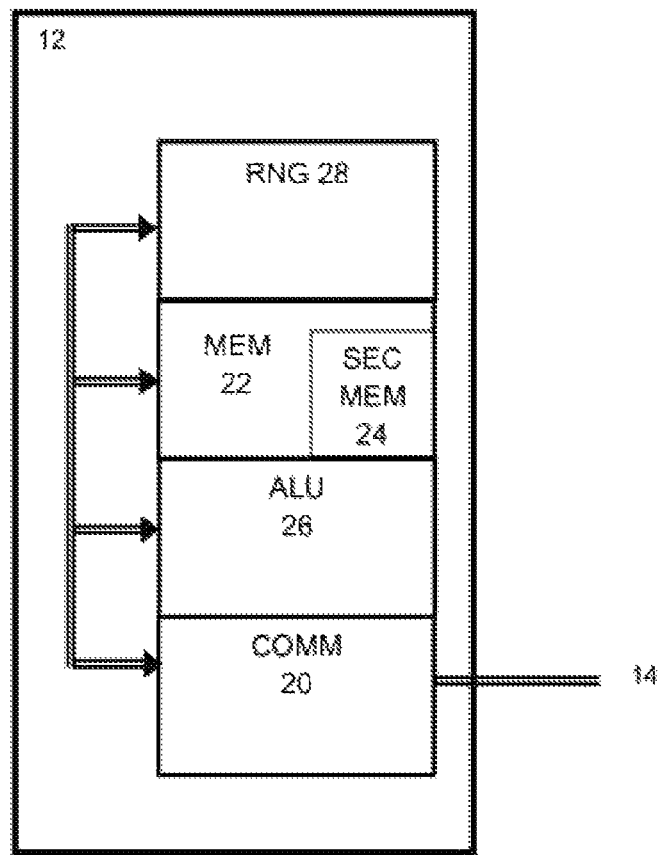
FIG. 2 is a representation of a device used in the data communication system of FIG. 1.

As shown in FIG. 2, the devices 12 will differ according to their intended purpose, but typically will include a communication module 20 for communication to the links 14. A memory 22 provides a storage medium for non-transient instructions to implement protocols and to store data as required. The instructions are executed by an arithmetic logic unit (ALU) 26 (or processing unit). A secure memory module 24, which may be part of memory 22 or may be a separate module, is used to store private information, such as the private keys used in the encryption protocols and withstand tampering with that data. The arithmetic logic unit (ALU) 26 (or processing unit) is provided to perform the arithmetic operations instruction by the memory 22 using data stored in the memories 22, 24. A random or pseudo random number generator 28 is also incorporated to generate bit strings representing random numbers in a cryptographically secure manner.

It will be appreciated that the device 12 illustrated in FIG. 2, is highly schematic and representative of a conventional device used in a data communication system.

The memory 22 stores system parameters for the ECC scheme to be implemented and a set of computer readable instructions to implement the ECC scheme. The parameters can be represented as bit strings, or any other suitable computer-readable representation.

Generally, simple side-channel attack countermeasures ("SSCA countermeasures"), in ECC, against simple SCA aim to make the observable information independent of the secret scalar d. The observable information being, for example, power consumption, timing, emissions, or the like.

Generally, differential side-channel attack countermeasures ("DSCA countermeasures") aim to thwart statistical analyses used by an attacker employing a differential SCA. One such DSCA countermeasure approach is to add randomness in the representation of the elements used in the cryptographic operations. For example, it is possible add randomness by masking or blinding in the scalar multiplication used in elliptic curve cryptography.

A common simple side-channel attack is a timing attack. Such attacks use the timing/execution time of algorithms as a side-channel to derive secret information. In further cases, the power consumption of the algorithm can be used to divulge secret information. For example, in the standard double-and-add algorithm, the step DOUBLE takes less power than the step ADD. This means that for each round, where there is one round for each bit of secret scalar in the double-and-add algorithm, it is distinguishable whether in that round the step is DOUBLE or ADD. Therefore, it is possible to gain knowledge of the corresponding bit of the secret scalar. A countermeasure against this type of attack is to make the execution time and power consumption of the algorithm independent of the input.

In an embodiment of a SSCA countermeasure, an ECC scheme can present constant-time and power consumption algorithms for the fundamental elliptic curve point multiplication operation. For elliptic curve point multiplication, there are two cases: multiplication of the generator point and multiplication of an unknown point. In this case, SSCA countermeasure makes the DOUBLE and ADD step indistinguishable with respect to time and power consumption. In a certain approach, the scheme would always perform the ADD operation, even when using only DOUBLE would be possible.

A common differential side-channel attack employs statistical analyses of multiple operations involving the secret scalar of ECC. Such an approach enables the scheme to derive the secret scalar from a computation d·P despite the availability of countermeasures against SSCA. As a differential side-channel attack countermeasure, masking or blinding may be employed by an ECC scheme.

In an embodiment of a DSCA countermeasure, an ECC scheme can prevent attempts to extract the secret scalar d·P with DSCA. The ECC scheme can do this, for example, through introducing randomness in the scalar multiplication to add sufficient noise. This randomness can thwart statistical analyses used by DSCA.

In an embodiment, randomness can be injected in the ECC scheme by masking or blinding a point P involved in the scalar multiplication d·P. This approach works by adding a secret random point R to P, as follows:
1. Select a random point R on the elliptic curve;
2. Instead of computing d·P, compute d·(R+P);
3. Subtract S=d·R to obtain d·P; and
4. For the next operation, refresh R and S: $R=(-1)^b 2R$ and $S=(-1)^b 2S$, where b is a random bit generated each time.

Note that the resulting computation is equivalent to calculating d·P:

$$d \cdot (R+P) - S = d \cdot (R+P) - d \cdot R = d \cdot P$$

For the subsequent iterations it holds that:

$$R=(-1)^b 2R,$$

$$S=(-1)^b 2S, \text{ and}$$

$$d \cdot ((-1)^b 2R + P) - (-1)^b 2S = d(-1)^b 2dR - (-1)^b 2dR + dP = d \cdot P.$$

In another embodiment, randomness can be injected in the ECC scheme by randomizing the point representation. In this way, analysis on the originally provided points can be avoided, and the ECC scheme can take advantage of the fact that projective representations are not unique. In this way, efficiency may be improved compared to the previous embodiment.

Typically, whenever an affine point (x,y) is converted to any form of projective coordinates representation, then X=x, Y=y, and Z=1. However, this leaves the direct correspondence to the original point. In order to randomize according to the present embodiment, a random coordinate Z is picked for every conversion and a corresponding projective point is obtained. For each of the following representations, this is done as follows:

Standard projective coordinates: $(Z \cdot x : Z \cdot y : Z)$
Jacobian projective coordinates: $(Z^2 \cdot x : Z^3 \cdot y : Z)$
Chudnovsky projective coordinates: $(Z^2 \cdot x : Z^3 \cdot y : Z : Z^2 : Z^3)$
Modified Jacobian coordinates: $(Z^2 \cdot x : Z^3 \cdot y : Z : aZ^4)$ In a certain embodiment, with respect to using the Jacobian representation, the point representation can be formed as follows:

1. Given a point R=(x,y) in affine coordinates, pick a random Z in $F_p^*$;
2. Compute $X=Z^2 \cdot x$ and $Y=Z^3 \cdot y$.
3. Set the point to be (X:Y:Z).

In most cases, every time the conversion is performed, Z must be a new random element.

In order to ensure efficiency of the ECC scheme, optimization of certain operations can be employed.

In a particular case, approaches such as performing computations in various types of projective coordinates of elliptic curves can be used. In the present embodiments, G is taken to be the fixed generator point for the elliptic curve E.

Some approaches for optimization can take advantage of their narrow applicability to certain types of computations. In an embodiment, for most ECC applications, there is a generator point G, which can be reused a number of times. The reuse of the generator point can be utilized for optimizing calculations using the generator point by precomputing tables for it.

In assorted cases, there are various elliptic curve operations performed in cryptographic schemes. At one extreme, the scheme can be fully optimized for speed; but this would generally entail that no countermeasures are used because generally countermeasures slow down running time. A scheme that is fully optimized for speed is generally not appropriate because it makes the implementation vulnerable to various side-channel attacks. At another extreme, the cryptographic scheme can apply countermeasures at every feasible instance. However, this extreme is not plausible because it generally makes the algorithms run unreasonably slow.

Hence, for elliptic curve cryptographic schemes, in order to function optimally or near optimally, a determination is required of what type of elliptic curve operations require countermeasures, and if so, what level of countermeasures are needed. As a result of such determination, it can be ensured that the security of the schemes is as high as required without unduly affecting the running time. In this way, the ECC schemes can be secure and as optimized as possible with respect to performance.

As an example of such determinations, certain steps in the scheme may not actually require countermeasures; for example, due to the fact that certain operations are fully public anyway.

With the embodiments described herein, there is provided the advantage of obtaining a maximally secure, yet efficient, ECC scheme. As such, the ECC scheme, as described herein, applies the required countermeasures, but only in places where such countermeasures are necessary, because countermeasures tend to reduce the performance of the scheme. Further, the ECC scheme, as described herein, applies optimizations where such optimizations are applicable and do not conflict with countermeasures already in place.

As contemplated herein, countermeasure requirements come in three levels: none required, SSCA countermeasures required, and DSCA countermeasures required. Due to their nature, DSCA are generally required when SSCA are already in place. Hence, whenever DSCA countermeasures are required, it is understood that SSCA countermeasures are also required.

In the case of ECC, it has been determined that DSCA only need be applicable when different elliptic curve points are used for scalar multiplication by the same secret scalar. For all other scenarios, SSCA countermeasures are generally sufficient for protection.

Optimizations of elliptic curve operations can come in various categories and scenarios of applicability, as is known in the art. A useful distinction for the purposes of the embodiments described herein is whether some precomputation is possible or not. Generally, precomputation is possible whenever the elliptic curve operation has fixed parameters. Fixed parameters of an ECC scheme can be the secret scalar and the elliptic curve generator point G. As contemplated in the embodiments herein, since the secret scalar is the most vital part of secret information in the ECC scheme, there must be no precomputation related to it; otherwise the scheme may be susceptible to leakage of vital secret information. As the elliptic curve generator point G is public, optimizations, based on precomputations, can be applied to it.

In various instances, some optimization and countermeasure techniques of ECC can conflict with each other. In most cases, when such conflict arises, a determination is made considering speed of computation versus security against attacks. In order to advantageously address such conflict, the ECC scheme, described herein, only applies countermeasures where they are required and optimizations where they are applicable and can avoid conflicting with countermeasures in place. For the purposes of clarity, it is contemplated that elliptic curve operations can be considered as part of one of four main types. These four types cover the entire set of possible elliptic curve cryptographic operation types in the ECC scheme and are as follows:

Type 1: Scalar multiplication of the generator point G by a secret parameter. For security purposes, it is vital that this type of elliptic curve operation includes sufficient security measures. Upon determination of this type of elliptic curve operation, countermeasures against SSCA need to be applied. However, countermeasures against DSCA are not required for this type of elliptic curve operation because the multiplication by secret scalar is performed only to a fixed generator point. For this type of elliptic curve operation, after applying the required countermeasures against SSCA attacks, optimization techniques are applied as long as such optimizations do not conflict with the countermeasures in use against SSCA. For this type of elliptic curve operation, the ECC scheme can use the fact that G is fixed and known beforehand, and as such, can apply fixed-point optimizations.

Type 2: Scalar multiplication of the generator point G by a publicly known parameter. The computations in this type of elliptic curve operation are public and hence generally do not require any countermeasure techniques. This is due to the fact that G is known and the scalar is known, hence the operation is fully public and can be computed by anyone. For this type of elliptic curve operation, only optimization techniques need to be applied. Since G is fixed, the ECC scheme can apply fixed-point related optimizations.

Type 3: Scalar multiplication of a point P by a secret parameter, whereby P does not equal generator point G. For security purposes, it is also vital that this type of elliptic curve operation includes sufficient security measures. For this type of elliptic curve operation, countermeasure techniques against both SSCA and DSCA need to be applied. Since this operation involves a scalar multiplication by secret parameter, countermeasures against SSCA are required. Due to the fact that the scalar multiplication is applied to a point different from G, this means that the same secret scalar is used more than once, making this type of elliptic curve operation vulnerable to DSCA. Accordingly, this type of elliptic curve operation must be protected against DSCA. In a particular case, the ECC scheme can apply blinding to counter DSCA. For this type of elliptic curve operation, after applying the required countermeasures against SSCAs and DSCAs, optimizations techniques which do not conflict with the countermeasures used can be applied. Due to the fact that this category needs both countermeasure against SSCA and DSCA, and that the point P is not fixed, there is the least number of optimization techniques applicable for this type of elliptic curve operation.

Type 4: Scalar multiplication of a point P by a publicly known parameter, whereby P does not equal generator point G. Similar to Type 2 above, this type of elliptic curve operation does not generally influence the security of the scheme. Hence, no countermeasure techniques are generally needed. As above, this is due to the fact that the scalar is public and point P is not secret. Hence, this type of operation is fully public and can be computed by anyone. For this type of elliptic curve operation, only optimization techniques need to be applied.

With respect to operations of Type 2 and Type 4, described above, the computations for these operations are completely public. Particularly, the scalar and the elliptic curve point in the operations are publicly available. Hence, it is assumed that anyone can perform these computations and that the operations do not possess secret information. Therefore, no countermeasures are required for these types of operations and only optimizations are applied. For operation of Type 2, the elliptic curve point is the fixed generator point G, and because of this, optimizations related to precomputed information about G can also be applied.

With respect to operations of Type 1 and Type 3, described above, the computations for these operations involve performing scalar multiplication by the secret scalar. Due to this fact, countermeasures are required for these types of operations. SSCA countermeasures are applied to operations for both operations of Type 1 and Type 3. For operations of Type 1, scalar multiplication by secret scalar is performed only to generator point G, and not any other point. Accordingly, for operations of Type 1, no DSCA countermeasures need be applied. In contrast, for operations of Type 3, scalar multiplication involves a secret scalar applied to other points. Accordingly, for operations of Type 3, as a minimum, there would be a second time when scalar multiplication by a given secret scalar is performed by that scalar, as it is known that the scalar multiplication was performed to G originally. Accordingly, for operations of Type 3, DSCA countermeasures are to be applied. In an embodiment, DSCA countermeasure can include point masking, blinding, or the like.

With respect to operations of Type 1 and Type 3, after applying the countermeasures described above, optimizations can be applied which do not conflict with countermeasures already in place. For operations of Type 3, due to the fact that this type of operation has the most countermeasures applied to it, less optimizations can be applied. However, certain optimizations can still be applied to operations of Type 3. For operations of Type 1, the operations involve a fixed generator point G; hence, optimizations that make use of precomputational techniques can also be applied.

Figure 4:
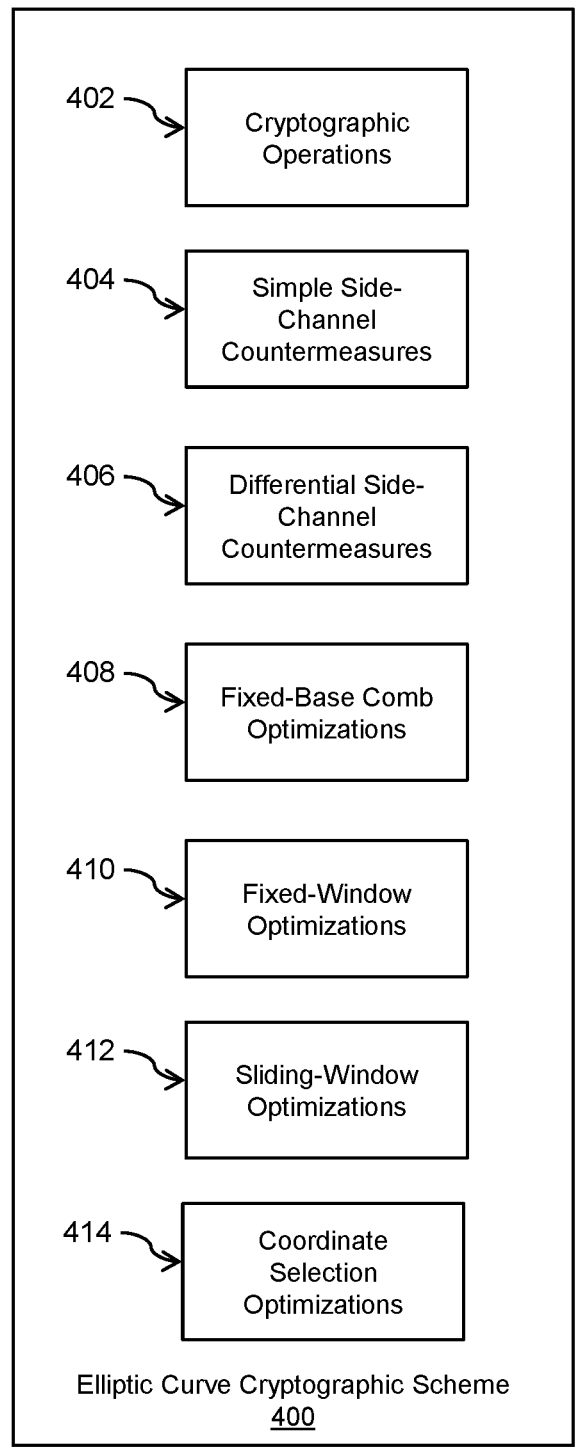
FIG. 4 is a conceptual block diagram showing the elliptic curve cryptographic scheme of FIG. 3.

Turning to FIG. 4, a conceptual block diagram of an elliptic curve cryptographic ("ECC") scheme 400, according to an embodiment, is shown. The elliptic curve cryptographic scheme 400 permits secure communications between two or more cryptographic correspondent devices 12. Each of the cryptographic correspondent devices 12 includes at least a processor 26 and a memory 22. The memory 22 is configured to store a plurality of instructions which when executed by the processor 26 cause the processor 26 to implement the elliptic curve cryptographic scheme 400.

The elliptic curve cryptographic scheme 400 includes cryptographic operations 402, simple side-channel attack ("SSCA") countermeasures 404, differential side-channel attack ("DSCA") countermeasures 406, and optimizations. The optimizations can be, for example, fixed-base comb optimizations 408 (also called Lim-Lee method optimizations), fixed-window optimizations 410, sliding-window optimizations 412, coordinate selection optimizations 414, or the like.

In an embodiment, the elliptic curve cryptographic scheme 400 includes selectively applying SSCA countermeasures 404, DSCA countermeasures 406, and optimizations 408, 410, 412, 414 to the cryptographic operations 402. In most cases, the cryptographic operations 402 include scalar multiplications.

Figure 3:
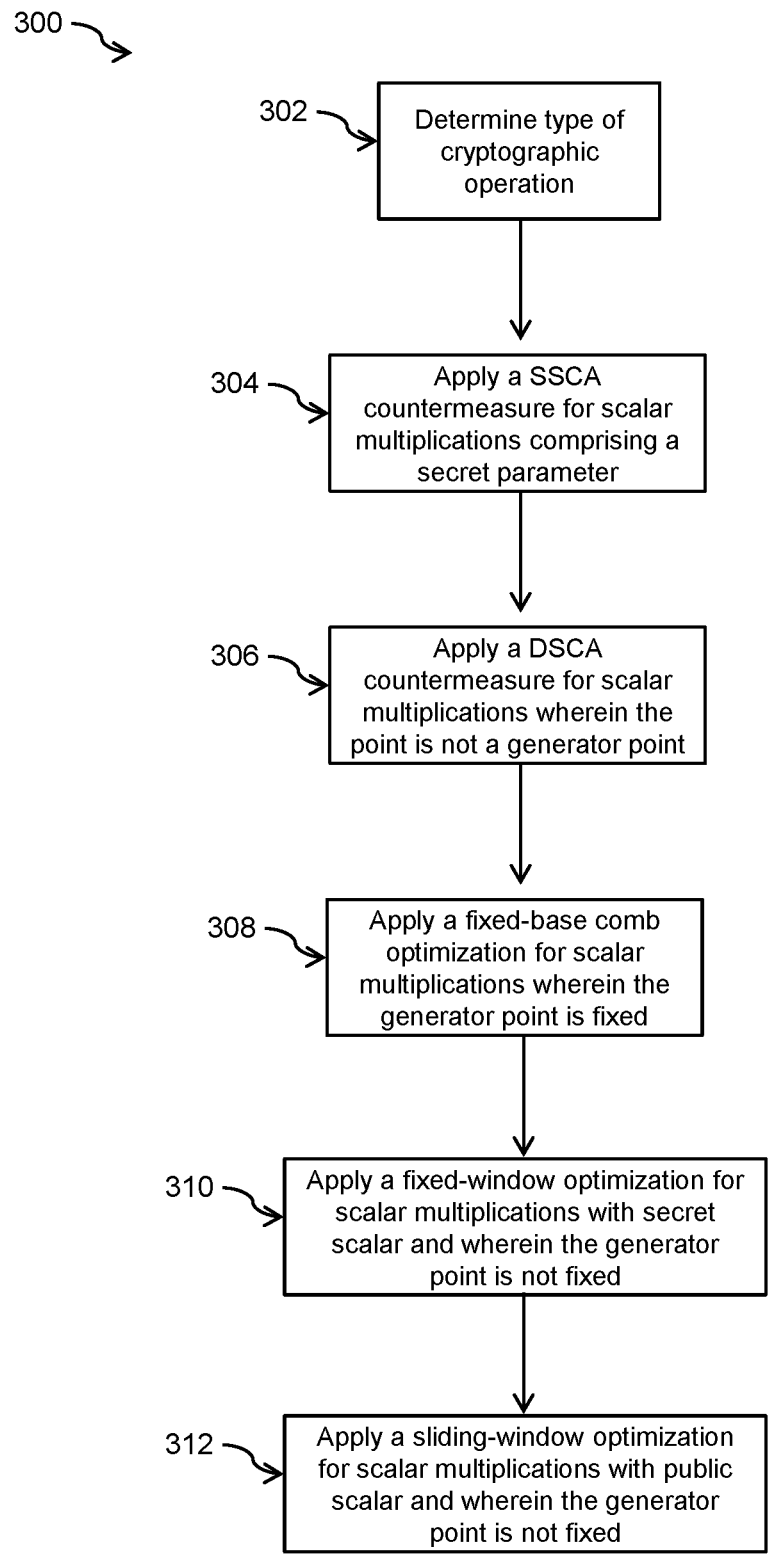
FIG. 3 is a flow chart showing a method for implementing a elliptic curve cryptographic scheme according to an embodiment.

FIG. 3 is a flow chart showing an exemplary method 300 of implementation of the elliptic curve cryptographic scheme 400.

At block 302, the elliptic curve cryptographic scheme 400 includes determining the type of cryptographic operation.

At block 304, the elliptic curve cryptographic scheme 400 includes applying a simple side-channel attack countermeasure for scalar multiplications comprising a secret parameter as the parameter.

At block 306, the elliptic curve cryptographic scheme 400 includes applying a differential side-channel attack countermeasure for scalar multiplications when the point is not a generator point of the elliptic curve.

At block 308, the elliptic curve cryptographic scheme 400 includes applying a fixed-base comb optimization for scalar multiplications when the generator point is fixed. In further embodiments, other fixed-point optimizations may be applied along with, or instead of, the fixed-base comb method, as applicable.

At block 310, the elliptic curve cryptographic scheme 400 includes applying a fixed-window optimization for scalar multiplications comprising a secret scalar as the parameter when the generator point is not fixed.

At block 312, the elliptic curve cryptographic scheme 400 includes applying a sliding-window optimization for scalar multiplications comprising a public scalar as the parameter when the generator point is not fixed.

In further cases, further optimizations, for example coordinate selection, can be applied in the elliptic curve cryptographic scheme 400 where applicable, regardless of whether the generator point is fixed.

Figure 5:
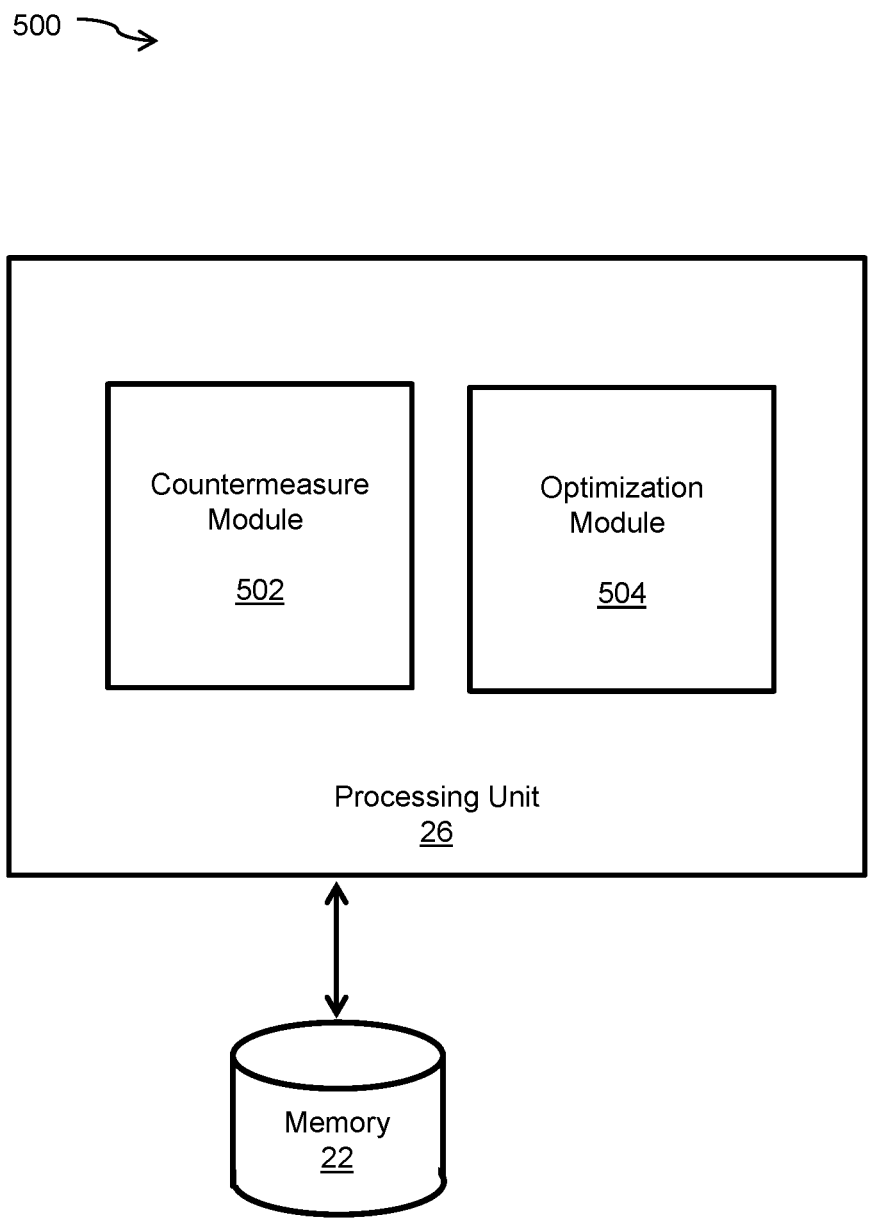
FIG. 5 is a block diagram showing an exemplary system for implementing the elliptic curve cryptographic scheme on a correspondent device.

FIG. 5 is a block diagram showing an exemplary system 500 for implementing the elliptic curve cryptographic scheme 400 on the correspondent device 12. The system 500 implemented on correspondent device 12 includes the processing unit 26 and the memory 22. The processing unit 26 includes a countermeasure module 502 and an optimization module 504. The elliptic curve cryptographic scheme 400 includes scalar multiplication of a point by a parameter.

The countermeasure module 502 applies a simple side-channel attack countermeasure for scalar multiplications that include a secret scalar as the parameter. The countermeasure module 502 also applies a differential side-channel attack countermeasure for scalar multiplications that include a secret scalar as the parameter when the point is not a generator point of the elliptic curve.

The optimization module 504 applies a fixed-base comb optimization for scalar multiplications when the generator point is fixed. The optimization module 504 also applies a fixed-window optimization for scalar multiplications that include a secret scalar as the parameter when the generator point is not fixed. The optimization module 504 also applies a sliding-window optimization for scalar multiplications that include a public scalar as the parameter when the generator point is not fixed.

Applicant recognized the substantial advantages of the ECC scheme 400, described herein, that can provide optimal security while optimizing computational performance to the greatest extent possible. As an example, Applicant recognized the advantages to computational performance if DSCA countermeasures are only applied if the same scalar is used with different elliptic curve points. For all other ECC operations, DSCA countermeasures are not applied to save computational resources.

Applicant also recognized the substantial advantages of the ECC scheme 400, described herein, for selective optimization. Particularly, if the generator point is fixed, applying optimizations using precomputation.

Applicant also recognized the substantial advantages of the ECC scheme 400, described herein, over those of conventional ECC schemes. As an example, in conventional ECC schemes, typically, if countermeasures are applied, then they are universally applied throughout the scheme, and applicable optimizations are applied. In contrast, the Applicant recognized the advantages of an ECC scheme 400 in which countermeasures and optimizations are selectively applied based on the type of operation. The ECC scheme described herein provides four concrete types of operations, as described above, which generally cover all types of possible scalar multiplications that can be applied to an elliptic curve-based scheme. In this way, the ECC scheme 400 advantageously provides exact implementation of countermeasures, and the combination of such countermeasures with optimizations. The ECC scheme 400, described herein, advantageously provides an exact and directly practically applicable methodology; ensuring that countermeasures are only applied where needed, and not applied where they are unnecessary.

Although the invention has been described with reference to certain specific embodiments, various other aspects, advantages and modifications thereof will be apparent to those skilled in the art without departing from the spirit and scope of the invention as outlined in the claims appended hereto. The entire disclosures of all references recited above are incorporated herein by reference.

We claim:

1. An elliptic curve cryptographic scheme for permitting secure communications between two or more cryptographic correspondent devices, at least a portion of the elliptic curve cryptographic scheme being performed by one of the cryptographic correspondent devices comprising a processor and a memory, the elliptic curve cryptographic scheme comprising:
    applying a plurality of cryptographic operations to cryptographic parameters, wherein the plurality of cryptographic operations comprise scalar multiplication of a point and a parameters;
    determining whether or not the point is a generator point of the elliptic curve cryptographic scheme;
    determining whether the generator point is fixed when the point is a generator point of the elliptic curve cryptographic scheme;
    determining whether the parameter comprises a secret scalar or a public scalar;
    selectively applying countermeasures and optimizations to the scalar multiplication to reduce computational resources used in the elliptic curve cryptographic scheme, by:
        applying a simple side-channel attack countermeasure when the parameter is a secret scalar;
        applying a differential side-channel attack countermeasure when the parameter is a secret scalar and the point is not a generator point of the elliptic curve cryptographic scheme;
        applying a fixed-base comb optimization when the generator point is fixed;
        applying a fixed-window optimization when the parameter is a secret scalar and the generator point is not fixed; and
        applying a sliding-window optimization when the parameter is a public scalar and the generator point is not fixed.

2. The elliptic curve cryptographic scheme of claim 1, wherein at least one of the optimizations comprise precomputation.

3. The elliptic curve cryptographic scheme of claim 1, wherein the fixed-base comb optimization is only applied when the fixed-base comb optimization does not conflict with the simple side-channel attack countermeasure.

4. The elliptic curve cryptographic scheme of claim 1, wherein the differential side-channel attack countermeasure comprises point masking.

5. The elliptic curve cryptographic scheme of claim 1, wherein the differential side-channel attack countermeasure comprises blinding.

6. The elliptic curve cryptographic scheme of claim 1, wherein the simple side-channel attack countermeasure comprises making observable information associated with at least one of the two or more cryptographic correspondent device independent of the secret scalar.

7. The elliptic curve cryptographic scheme of claim 6, wherein the simple side-channel attack countermeasure comprises making the scalar multiplication have constant-time.

8. The elliptic curve cryptographic scheme of claim 6, wherein the simple side-channel attack countermeasure comprises making the scalar multiplication have constant power consumption.

9. The elliptic curve cryptographic scheme of claim 1, wherein the elliptic curve cryptography scheme is further characterized by applying further optimizations comprising coordinate selection.

10. A method for implementing an elliptic curve cryptography scheme on a cryptographic correspondent device comprising a processor and a memory, the elliptic curve cryptographic scheme comprising:
    determining whether or not the point is a generator point of the elliptic curve cryptographic scheme;
    determining whether the generator point is fixed when the point is a generator point of the elliptic curve cryptographic scheme;
    determining whether the parameter comprises a secret scalar or a public scalar;
    selectively applying countermeasures and optimizations to the scalar multiplication to reduce computational resources used in the elliptic curve cryptographic scheme, by:
        applying a simple side-channel attack countermeasure when the parameter is a secret scalar;

applying a differential side-channel attack countermeasure when the parameter is a secret scalar and the point is not a generator point of the elliptic curve cryptographic scheme;

applying a fixed-base comb optimization when the generator point is fixed;

applying a fixed-window optimization when the parameter is a secret scalar and the generator point is not fixed; and applying a sliding-window optimization when the parameter is a public scalar and the generator point is not fixed.

11. The method of claim 10, wherein the fixed-point optimization comprises precomputation.

12. The method of claim 10, wherein the fixed-base comb optimization is only applied when the fixed-base comb optimization does not conflict with the simple side-channel attack countermeasure.

13. The method of claim 10, wherein the differential side-channel attack countermeasure comprises point masking.

14. The method of claim 10, wherein the differential side-channel attack countermeasure comprises blinding.

15. The method of claim 10, wherein the simple side-channel attack countermeasure comprises making observable information associated with the cryptographic correspondent device independent of the secret parameter.

16. The method of claim 15, wherein the simple side-channel attack countermeasure comprises making the scalar multiplication have constant-time.

17. A system for implementing an elliptic curve cryptography scheme on a cryptographic correspondent device comprising a processor and a memory, system comprising:

a countermeasure module and an optimization module configured for:

applying a plurality of cryptographic operations to cryptographic parameters, wherein the plurality of cryptographic operations comprises scalar multiplication of a point and a parameter:

determining whether or not the point is a generator point of the elliptic curve cryptographic scheme;

determining whether the generator point is fixed when the point is a generator point of the elliptic curve cryptographic scheme;

determining whether the parameter comprises a secret scalar or a public scalar;

selectively applying countermeasures and optimizations to the scalar multiplication to reduce computational resources used in the elliptic curve cryptographic scheme, by:

applying a simple side-channel attack countermeasure when the parameter is a secret scalar;

applying a differential side-channel attack countermeasure when the parameter is a secret scalar and the point is not a generator point of the elliptic curve cryptographic scheme;

applying a fixed-base comb optimization when the generator point is fixed;

applying a fixed-window optimization when the parameter is a secret scalar and the generator point is not fixed; and applying a sliding-window optimization when the parameter is a public scalar and the generator point is not fixed.

18. The system of claim 17, wherein the fixed-point optimization comprises precomputation.

19. The system of claim 17, wherein the fixed-base comb optimization is only applied when the fixed-base comb optimization does not conflict with the simple side-channel attack countermeasure.

20. The system of claim 17, wherein the differential side-channel attack countermeasure comprises point masking or blinding.

* * * * *